(12) United States Patent
Volker et al.

(10) Patent No.: US 7,481,636 B2
(45) Date of Patent: Jan. 27, 2009

(54) DEVICE FOR THE PRODUCTION OF PLASTIC CONTAINERS BY MEANS OF STRETCH BLOW MOULDING AND DEVICE FOR COATING THE INNER WALLS OF A PLASTIC CONTAINER

(75) Inventors: Damerow Volker, Uelversheim (DE); Heinrich Gruenwald, Niddatal (DE); Jens Fuchs, Uelversheim (DE); Hanno Käβ, Darmstadt (DE); Lothar Wilhelm, Karben-Groβ-Karben (DE); Hans Kindinger, Bensheim (DE); Eberhard Sendobry, Rimbach (DE); Rudiger Wlach, Buttelborn (DE)

(73) Assignee: Tetra Laval Holdings & Finance S.A., Pully (CH)

( * ) Notice: Subject to any disclaimer, the term of this patent is extended or adjusted under 35 U.S.C. 154(b) by 404 days.

(21) Appl. No.: 10/507,569
(22) PCT Filed: Mar. 17, 2003
(86) PCT No.: PCT/EP03/02736
§ 371 (c)(1),
(2), (4) Date: Jan. 18, 2006
(87) PCT Pub. No.: WO03/078136
PCT Pub. Date: Sep. 25, 2003

(65) Prior Publication Data
US 2006/0110483 A1 May 25, 2006

(30) Foreign Application Priority Data
Mar. 18, 2002 (DE) .................. 102 11 878
Jul. 11, 2002 (DE) .................. 102 31 345

(51) Int. Cl.
*B29C 49/46* (2006.01)
*B29C 49/58* (2006.01)
(52) U.S. Cl. .............. 425/1; 425/90; 425/170; 425/529; 425/535; 425/540
(58) Field of Classification Search ............ 425/1, 425/90, 96, 169, 170, 529, 535, 540; 264/84
See application file for complete search history.

(56) References Cited

U.S. PATENT DOCUMENTS 2,892,733 A 6/1959 Gardner et al. ............. 117/46

(Continued)

FOREIGN PATENT DOCUMENTS

DE 33 12 920 C1 10/1984

(Continued)

OTHER PUBLICATIONS

Partial translation of DE 10118242 A1 obtained from the EPO website. The reference is dated Dec. 2002.*

*Primary Examiner*—Robert B Davis
(74) *Attorney, Agent, or Firm*—Michael L. Dunn

(57) ABSTRACT

Apparatus for producing plastic containers by stretch blowing including a rotatable rotor and at least one distributor block connected to the rotor. The distributor block has a mixing chamber that can be directly connected to an internal space of a preform so that a combustion chamber is formed from the mixing chamber and the internal space of the preform. A feed device is provided for feeding an explosive fluid into the combustion chamber and a firing device is provided for firing the explosive fluid in the combustion chamber. Of importance is that the distributor block can be connected directly to a preform or to a formed container. The apparatus is desirably a round rotor machine with a rotatable carousel for receiving a plurality of distributor blocks having a mixing chamber that can be directly connected to an internal space of a preform. The distributor blocks are desirably arranged in such a way that they can be rotated together with the carousel. The invention also includes an apparatus, in particular a round rotor machine, for coating the inside walls of a plastic container with a barrier layer which is impermeable in relation to gases, aroma substances and the like, in which a stretch blowing mould is connected by way of a connecting portion to valve-controlled fluid lines in order to fill the container in the mould with at least one gas.

35 Claims, 10 Drawing Sheets

U.S. PATENT DOCUMENTS

| | | | |
|---|---|---|---|
| 3,100,910 A * | 8/1963 | Martin | 425/1 |
| 3,236,080 A | 2/1966 | Illgen | 72/56 |
| 3,694,424 A | 9/1972 | Hunkar et al. | 264/98 |
| 4,214,860 A | 7/1980 | Kleimenhagen et al. | 425/149 |
| 5,531,060 A | 7/1996 | Fayet et al. | 53/426 |
| 5,895,666 A * | 4/1999 | Brilman | 425/1 |
| 6,315,939 B1 * | 11/2001 | Mock et al. | 264/454 |
| 6,796,780 B1 * | 9/2004 | Chatard et al. | 425/1 |

FOREIGN PATENT DOCUMENTS

| | | |
|---|---|---|
| DE | 195 02 103 A1 | 8/1995 |
| DE | 199 38 724 A1 | 2/2001 |
| DE | 100 04 274 A1 | 8/2001 |
| DE | 100 65 652 A1 | 7/2002 |
| DE | 101 18 242 A1 | 12/2002 |
| EP | 0824 978 A1 | 2/1998 |
| GB | 1026056 | 4/1966 |
| JP | 56-027329 | 3/1981 |
| JP | 56-027330 | 3/1981 |
| WO | WO 95/21948 | 8/1995 |
| WO | WO 98/06559 | 2/1998 |
| WO | WO 99/17334 | 4/1999 |
| WO | WO 01/56706 A1 | 8/2001 |
| WO | WO 02/09891 A1 | 2/2002 |
| WO | WO 02/053351 A1 | 7/2002 |
| WO | WO 02/076709 A1 | 10/2002 |

* cited by examiner

DEVICE FOR THE PRODUCTION OF PLASTIC CONTAINERS BY MEANS OF STRETCH BLOW MOULDING AND DEVICE FOR COATING THE INNER WALLS OF A PLASTIC CONTAINER

BACKGROUND OF THE INVENTION

The invention firstly concerns an apparatus for producing plastic containers by means of stretch blowing having, a feed device for feeding an explosive fluid into a combustion chamber and a firing device for firing the explosive fluid in the combustion chamber. In addition the present invention concerns an apparatus for coating the inside walls of a plastic container with a barrier layer which is impermeable in relation to gases, aroma substances and the like, in which a stretch blowing mould is connected by way of a connecting portion to valve-controlled fluid lines in order to fill the container in the mould with at least one gas.

Plastic containers are frequently produced by stretch blow moulding. In that procedure a preform is generally firstly produced by injection moulding. That preform is usually of a diameter which is smaller than the diameter of the bottle to be produced and a length which is shorter than the length of the bottle to be produced. In addition the preform generally already has an opening which is already in the form of the opening of the bottle to be produced. For example the opening can be provided with a screwthread and a holding ring. The preform is then firstly heated and introduced into a stretch blowing mould, the internal space of which corresponds to the finished container. Now, generally by means of a stretching ram which is axially introduced into the preform, the shape is axially stretched. That operation involves producing in the preform an internal pressure which is mostly in a range of between about 5 and about 15 bars. After the preform has been correspondingly stretched the internal pressure in the preform is markedly increased, that is to say to a range of from about 30 to 50 bars, whereby the preform is 'blown up' and pressed against the inside wall of the stretch blowing mould so that it assumes the shape of the container to be produced.

WO 98/06559 discloses an apparatus for producing containers. Here, PET bottles are produced by a procedure in which firstly a preform is heated to a temperature of about 100 to 120° C., which is suitable for the stretch blowing operation. That preform is introduced into a tool mould corresponding to the shape of the container and a stretching pressure of at least 2 bars, usually from 5 to 10 bars, is produced. The preform is axially stretched by means of an axial and generally vertically movable stretching ram. Thereupon a blowing pressure which is in the region of 40 bars is produced in the preform. As a result the wall of the preform is pressed against the inside wall of the mould and the container is shaped in that way.

Usually the stretching pressure is produced by means of compressed air. In contrast however, for producing the blowing pressure, there is usually provided a special compressed air container which by virtue of the high pressure necessary is subject to high safety requirements and for that reason the procedure is very expensive.

WO 98/06559 has therefore already proposed that the stretching pressure should be produced by blowing an explosive gas mixture into the preform, for example a mixture of oxyhydrogen gas and an inert gas, and providing the high blowing pressure by firing of the explosive gas mixture, in which case that explosion blowing pressure causes the wall of the preform or the partially pre-moulded container to be pressed entirely against the inside wall of the stretch blowing mould. The procedure also has the advantage that a short-term rise in temperature is produced by the explosion during the stretch blowing operation, whereby the container to be produced is sterilised.

In terms of technical implementation however it has been found that the containers produced with the known apparatus could not be used industrially. They could not be produced and reproduced in adequate quality in terms of their shape and volume and also in terms of their optical appearance. Thus for example it was not possible to produce PET bottles with clear transparent walls. It was assumed that this in part unattractive appearance occurred due to unwanted temperature influences which arose out of an only inadequately controllable explosion.

Therefore DE 199 38 724 already describes an apparatus for producing plastic containers by means of stretch blow moulding, in which the firing device is disposed in the internal space at the apparatus side so that the explosion can be better controlled. The apparatus described herein, in which the preform firstly has to be fixed at one end of a cylindrical receiving means, the side of which that is remote from the preform can be brought into engagement with a distributor block, can however only be used for linear machines as the structure of the distributor block including the firing device is so complicated and bulky that it can only be used in a stationary condition. In addition it has also been found with this apparatus that a proportion of finally moulded containers, which is not negligible, does not comply with the usual quality requirements. That is attributed inter alia to only insufficient mixing of the fluid components forming the explosive gas.

BRIEF DESCRIPTION OF THE INVENTION

Therefore an object of the present invention is to provide an apparatus of the kind set forth in the opening part of this specification, which makes it possible to produce plastic containers of high uniform quality and which in addition permits use on round rotor machines.

According to the invention that object is attained in that the distributor block can be connected directly to a preform, that is to say the distributor block has a connecting device for connecting the preform to the distributor block. In other words the preform can be brought into contact directly in fluid-tight relationship with the distributor block, without the interposition of a corresponding receiving means. That has a whole series of advantages. Firstly, it is possible to save on the receiving means which hitherto in the state of the art was considered to be necessary and which is arranged between the distributor block and the preform, and that contributes to a considerable saving in cost. On the other hand that reduces the volume proportion of the combustion chamber which is outside the preform. In particular, the mixing chamber is now disposed almost directly above the preform. That has the advantage that the gases forming the explosive mixture can be better meteredly added and in addition mixing thereof within the preform is better guaranteed.

Just by virtue of that measure it is possible for the distributor block to be arranged on a round rotor machine with a rotatable carousel for receiving a plurality of preforms. In that situation the round rotor machine advantageously has a plurality of and preferably 6 distributor blocks. While, in the case of the linear machines which have been known hitherto in the state of the art and which use so-called explosion stretch blowing, the limitation was to a maximum of about 6,000 bottles per hour, the explosion stretch blowing process can now also be used on round rotor machines with which a production of about 20,000 to 40,000 bottles per hour is possible.

More particularly, in a preferred embodiment, an apparatus is provided for producing plastic containers by stretch blowing including a rotatable rotor and at least one distributor block connected to the rotor. The distributor block has a mixing chamber that can be directly connected to an internal space of a preform so that a combustion chamber is formed from the mixing chamber and the internal space of the preform. A feed device is provided for feeding an explosive fluid into the combustion chamber and a firing device is provided for firing the explosive fluid in the combustion chamber. Of importance is that the distributor block can be connected directly to a preform or to a formed container.

The apparatus is desirably a round rotor machine with a rotatable carousel for receiving a plurality of distributor blocks having a mixing chamber that can be directly connected to an internal space of a preform. The distributor blocks are desirably arranged in such a way that they can be rotated together with the carousel.

DETAILED DESCRIPTION OF THE INVENTION

Figure 1:
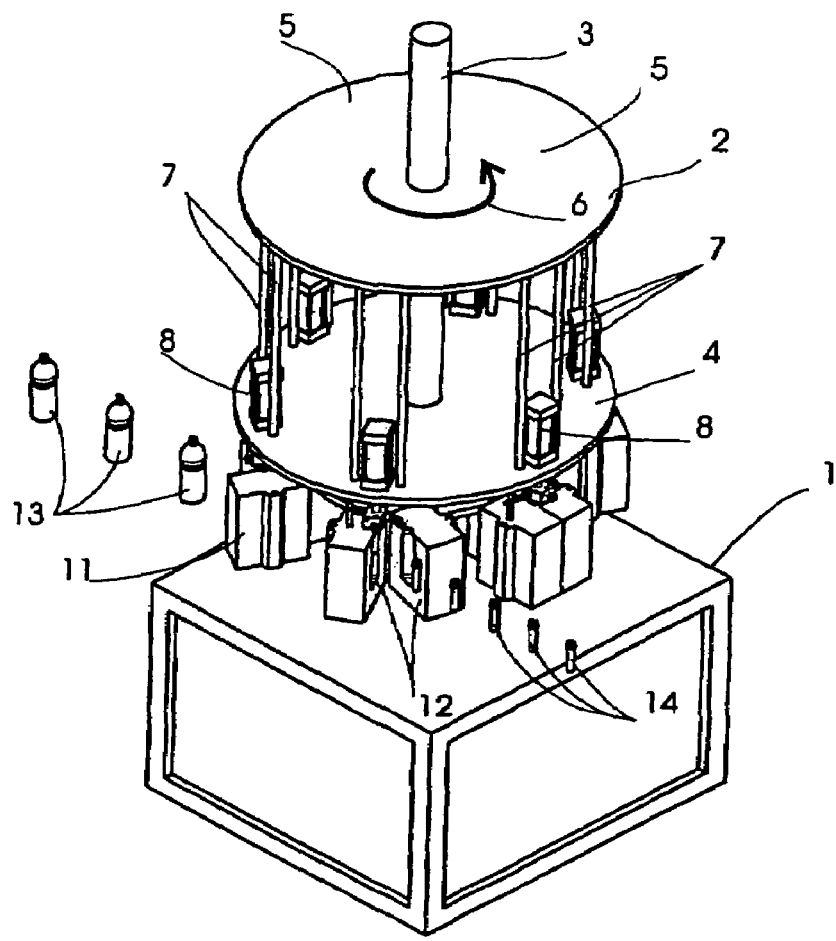
FIG. 1 is a perspective view of a rotational conveyor with six stretch blowing moulds arranged in the lower part at a spacing at its periphery, diagrammatically illustrating the introduced preforms and the removed finished containers in the form of bottles.

A particularly preferred apparatus in accordance with the invention is a round rotor machine wherein the distributor blocks are arranged in such a way that they can be rotated together with the carousel. That measure ensures that the round rotor machine can be operated at an extremely high speed.

During many different tests it was found that surprisingly the quality of the stretch blow-moulded containers can be markedly increased by virtue of omitting the receiving means or by directly connecting the preform to the distributor block. Further experiments showed that the volume of the mixing chamber in the distributor block, in a particularly preferred embodiment, is smaller than 50 $cm^3$, preferably smaller than 25 $cm^3$ and particularly preferably smaller than 15 $cm^3$. In accordance with the invention it is therefore provided that the mixing chamber, that is to say that part of the combustion chamber which is in the distributor block, is made as small as possible. By virtue of that measure the explosion or the metered addition of the individual fluids forming the explosive gas can be markedly better controlled. In addition, thorough mixing of the individual components of the explosive gas within the preform is markedly more homogeneous.

It was further possible to find that the reaction products produced in the explosion can adversely influence subsequent explosion procedures. With the relatively large mixing chambers which are provided in the state of the art and which in addition are further increased in size by a cylindrical receiving means, a not inconsiderable proportion of reaction products which are condensed for example on the walls of the mixing chamber inevitably remains in the distributor block upon removal of the finally moulded container and upon fitting of the next preform, and such remaining reaction products are available as an impurity in the following explosion procedure. Therefore the percentage proportion of the residues of the reaction products occurring in the explosion, when the finally moulded container is replaced by a fresh preform, is markedly greater in the apparatuses of the state of the art than in the case of the apparatus according to the invention Thus the measure according to the invention made it possible further to improve controllability and in particular reproducibility of the explosion procedure.

A particularly preferred embodiment further provides that the distributor block has cooling water passages for cooling the distributor block Particularly when using the explosion stretch blowing process in round rotor machines in which correspondingly many explosions are produced one after the other in quick succession, the distributor block experiences a significant rise in temperature. That gives rise to a temperature gradient between the preform and the distributor block, which can adversely affect the explosion performance. By virtue of the fact that the distributor block can be appropriately cooled, identical process conditions can be achieved during the entire operating period of the apparatus according to the invention.

That measure also exhibits a particular effect precisely in combination with the direct connection of the preform to the distributor block. Admittedly it would be possible in principle also to cool the distributor block in the apparatuses known from the state of the art, but that would not in any way alter the fact that the receiving means which is always additionally provided in the state of the art heats up, in repeated explosion procedures, so that this situation does not involve uniform process conditions.

Even if it is also possible in principle to feed the explosive fluid directly to the distributor block, nonetheless a particularly preferred embodiment provides that the distributor block has at least two separate fluid feed passages for the feed of two different fluids, the mixing of which forms the explosive fluid.

That measure enhances the safety of the apparatus as explosive fluid is to be found exclusively in the combustion chamber in which the explosive fluid is in any case to be ignited. More specifically, with a direct feed of the explosive fluid to the distributor block it can happen that the appropriately provided closure valve does not properly close and thereupon, upon firing of the explosive fluid in the combustion chamber, the explosive fluid which is still in the feed devices is also ignited.

Another particularly preferred embodiment provides that the distributor head has at least one needle valve for opening and/or closing at least one fluid feed passage. That makes it possible to provide for particularly accurate metering of the fluid, whereby the explosion can be better controlled. If the explosive fluid is formed for example from air and hydrogen, the needle valve is desirably used for opening and/or closing the feed for hydrogen.

Advantageously the needle valve is in the form of a non-return or check valve. That ensures that, even with a high pressure within the preform, the needle valve is not unintentionally opened.

The quality of the containers to be moulded can be further increased if the distributor head has a fluid discharge passage for carrying away the reaction products produced upon explosion of the explosive fluid. In the apparatuses in the state of the art, either no fluid discharge was provided so that, upon separation of the receiving means holding the preform, from the distributor head, the internal volume, which was under pressure, of the preform or the container which was in its final form at that time, was abruptly set to atmospheric pressure, or the fluid was carried away by way of the feed devices. The first procedure however suffers from the disadvantage that a not inconsiderable amount of the reaction products remains in the container after final moulding thereof and first has to be removed prior to filling of the container. The second procedure in contrast has the disadvantage that the reaction products which can detrimentally influence the explosion procedure escape into the fluid feed means, from which they are brought into the next preform again during the next step of feeding the explosive fluid thereto, and can have the described adverse effects in that next preform.

A preferred embodiment provides that there is a valve for closing and/or opening the fluid discharge passage, wherein the valve preferably has a locking device which prevents opening of the fluid discharge passage, and wherein the valve is preferably designed in such a way that, when the locking device is released, the valve is automatically opened due to the pressure occurring upon explosion of the explosive fluid. That measure provides that the valve can be constructed in a very inexpensive fashion. During the actual explosion stretch blowing procedure, the valve for closing and/or opening the fluid discharge passage is locked in the closed condition by means of the locking device. After the explosion has taken place, whereby the preform is caused to bear against the inside wall of the stretch blowing mould, the locking device is released so that the pressure which is in the container after the explosion is sufficient to automatically open the valve, whereby the pressure and at the same time the reaction products which have been produced in the explosion can leave the combustion chamber by way of the fluid discharge passage.

A desirable embodiment of the apparatus according to the invention provides that a stretching bar or a stretching ram provided with a drive extends through the mixing chamber and, when the apparatus is connected to a preform, into same, wherein the stretching bar is provided for axially stretching the preform. That measure further reduces the size of the mixing chamber, which, as already stated above, has positive effects on controllability of the explosion process. The stretching bar is advantageously approximately cylindrical with at least two portions of differing thicknesses, wherein in the extended condition of the stretching bar, that is to say when the stretching bar extends into the preform as far as the bottom thereof, the portion of smaller thickness is in the preform while the portion of larger thickness is in the mixing chamber.

The firing device preferably comprises a spark plug which is arranged either in the distributor block or in the part of the stretching bar which, when the preform is connected to the distributor block, extends into the preform.

In a further particularly preferred embodiment it is provided that there is a pressure sensor for measuring the pressure in the combustion chamber. In that way it is possible to detect whether the explosive mixture introduced in the preform has already fired. In particular it is possible to establish whether a sufficiently high pressure has been produced. If that was not the case, either the container can be suitably marked and disposed of or, in a further step, an explosive fluid can be introduced once again into the preform and fired again.

In general terms the explosive fluid comprises an explosive gas mixture. It is in principle however also possible to produce the explosive fluid by liquids. However many combustible liquids only exhibit explosive properties in the gaseous condition. The attempt has therefore already been made to vaporise liquid components before they are fed to the distributor block, which however by virtue of the necessary heating requires additional cost-intensive devices.

That can be avoided however in a further desirable embodiment in which there is provided a fluid line which is connected to an atomisation device and which opens in the mixing chamber. The atomisation device serves to finely atomise the liquid—entirely without a vaporiser—and to pass it in that mist form into the mixing chamber of the distributor block. The atomised fluid then has almost gas properties and can be converted for example with other gas components to form a homogeneous explosive gas mixture. That saves on the cost of a separate external vaporiser.

This point leads on to a further aspect of the invention. More specifically the invention also concerns an apparatus for coating the inside walls of a blow-moulded plastic container with a barrier layer which is impermeable for gases, aroma substances and the like, in which a stretch blowing mould or a container which has already been finally moulded is connected by way of a connecting portion to valve-controlled fluid lines in order to fill the container in the mould with at least one gas and possibly at least partially mould same.

The attempt has already been made with numerous machine installations to provide a barrier-like coating on the internal surfaces of the walls of such PET bottles, in order to provide that low-molecular gases, for example oxygen or carbon dioxide, through that barrier, substantially more slowly penetrate the plastic walls of the PET bottles. That therefore provides that, in the case of packed liquid foods, the drinks can retain their taste, their flavour and their quality substantially longer, due to the internal coating.

With the above-mentioned blow moulding tests, it was firstly necessary to produce a high pressure in the PET bottle of about 40 bars, which thereafter had to be released to vacuum, which involved a corresponding amount of time, in order to implement the—generally plasma-supported—coating operation. Apart from the lengthiness of that process, when switching over from high pressure to vacuum, and the use of large items of machine equipment, it was also found that the yield of the gases used is so slight that there was no possibility of industrial applicability.

While in the case of the described 'explosion stretch blow moulding' the explosive gas mixture in the state of the art could be produced exclusively by mixing gaseous components, the so-called 'precursor' material to be used for the coating operation represents a liquid component, for example the HMDSO which has already been used in a test structure. To produce the explosive gas mixture, the attempt has already been made in the operational structure to vaporise that liquid component in order then to again combine gases to form a mixture. With such a coating procedure, providing expensive measures in order to keep the installation at the desired working point, for example the use of temperature regulators, played no part. In industrial operation in contrast that expenditure in respect of measurement and regulating procedures represents a risk, just like the extensive sealing measures.

Therefore a further object of the invention is to provide a practical apparatus which is as simple as possible and by means of which containers, for example PET bottles, are provided on the inside both during the shaping procedure and also immediately thereafter with a barrier layer without having to use separate vaporisers.

According to the invention that object is attained in that the fluid lines open in a mixing chamber of a distributor block,
  the mixing chamber communicates with the internal space of the container,
  a fluid line leads to an atomisation device, and
  there is provided a firing device which fires the atomised and/or mixed fluids in the mixing chamber and the interior of the container for the purposes of combustion.

In that respect a particularly preferred embodiment provides that the container can be directly connected to the distributor block. This enjoys the advantages which have already been explained above in connection with the apparatus for producing blow-moulded containers, in particular this ensures that the atomised fluid arrives in the interior of the container in the atomised condition and does not already previously collect on the walls of the mixing chamber in a liquid condition. For accurate and controlled implementation of the explosion, it is a matter of crucial significance that the precursor material is atomised in the interior of the container. Therefore the reliability of the apparatus is decisively improved by the direct connection of the container to the distributor block, that is to say without interposition of the receiving means deemed necessary in the state of the art.

Advantageously the apparatus is intended to at least partially mould the container. In that respect the fluid line leading to the atomisation device preferably leads from a pump for the production of an internal pressure of at least 40 bars to the atomisation device. Accordingly the same machine can be used both for moulding the container or removing it from the mould and also for coating the container. It is possible by means of only one explosion process to implement at least partial shaping of the container and coating of the container, and it is also possible to achieve the individual procedures by means of separate explosions, in which respect the coating operation can take place both prior to and also during and after the step of shaping the container.

In an embodiment in which the container to be produced is coated in the course of the shaping process, gases are passed by way of the fluid lines into the mixing chamber and the interior of the container and combined to form an explosive gas mixture, the combustion of which by means of the firing device provides on the one hand for the high internal pressures for the shaping process and on the other hand provides for the necessary chemical reaction for coating the inside walls of the container. While the firable gas mixture can be produced by bringing gases together, a precursor material only in liquid form is available for the coating. In accordance with the invention that precursor liquid is now raised by a pump to a pressure of at least 40 bars and fed in that condition to an atomisation device. With that device the liquid—entirely without a vaporiser—is finely atomised and passed in that mist form into the mixing chamber of the distributor block. The atomised precursor material has almost gas properties and can be transformed with the other gas components into a homogeneous explosive gas mixture. All the expenditure on a separate external vaporiser is saved and nonetheless it is possible for the inside wall of the container to be provided with the desired barrier layer, simultaneously with the shaping process. The new coating apparatus can be of a practical and simple design configuration and surprisingly can also be used industrially in a large-scale mode of operation.

For the liquid component of the precursor material it is only necessary to convey the latter to the distributor block, compress it by means of the above-mentioned pump to a pressure of at least 40 bars and to pass it to an atomisation device. The atomisation operation can preferably be effected by injection from a nozzle into the mixing chamber, but the liquid can also be put into a condition of high rotation and/or it can be atomised by ultrasound. Care is then to be taken to ensure that the individual components are mixed as well as possible, which can preferably be achieved by a turbulent swirl effect. In addition, by virtue of the communication of the mixing chamber with the internal space of the container, it is necessary to provide that the freshly produced gas-mist mixture is also spread out into the container to be produced.

The new apparatus affords the user the required technical measures for using means for the essential steps for carrying out the coating process.

That also applies in regard to the other alternative mentioned above, in which the coating operation is to be effected immediately after the shaping process. In this embodiment the container is first put into its finished form, for example by stretch blow moulding or by explosion stretch blow moulding, and is then coated. The stretch blowing mould can either again receive the shaped container or the shaped container is still in the stretch blowing mould after the conclusion of the shaping procedure. In accordance with the invention the distributor block is mounted to the stretch blowing mould, the mixing chamber of the distributor block likewise being supplied by at least one fluid line, like the internal space of the container which communicates with the mixing chamber. The medium intended for the coating operation is then fed in the same manner to the atomisation device which is directly connected to the mixing chamber. By means of the firing device, the atomised and/or mixed fluids in the mixing chamber and the interior of the container are fired, burn and produce reaction products which are deposited on the inside wall of the container to form the desired barrier layer. The firable and reactionable mixture can be produced either by mixing various gases and/or mist fed to the mixing chamber or by atomisation itself.

Compressing of the fluid responsible for the coating, preferably a precursor gas, to at least 40 bars, permits atomisation in such a way that that fluid can also be introduced in finely divided manner in almost gas-like fashion in a mixture of other gases, to form a homogeneous flow. Possibly an increase in pressure of that fluid to at least 35 bars would also suffice. Tests have hitherto been successfully carried out at a pressure of over 40 bars.

In a particular embodiment gases are fed to the mixing chamber to form an explosive gas mixture in a relatively large amount and therefore over a relatively long period of time, in such a way that a pressure of over about 10 bars is already developed in the mixing chamber. The above-mentioned increase in pressure of the fluid by means of the pump to at least 40 bars has the further advantage that atomisation can also take place into the mixing chamber in which there are already gases under a pressure of over 10 bars. The coating apparatus according to the invention provides for the increase in pressure of the fluid responsible for the coating to at least 40 bars in each of the cases applied in practice for satisfactory atomisation and thus a more or less homogeneous gas mixture which is firable and which fully performs the required tasks.

The term 'pump for producing an internal pressure' is also used to mean equivalent means for increasing the pressure of the fluid. Thus, for a compressing operation, it is also possible to use for example a fluid connected in a pressure bottle for driving, conveying and compressing the fluids responsible for the coating.

According to the invention it is advantageous if the atomisation device has a liquid injection nozzle. It has already been stated above that liquids can also be atomised by the use of ultrasound. However a liquid injection nozzle is particularly simple and technically easily manageable and it has a long service life and in general does not involve stoppage times due to maintenance or repair.

It is further desirable in accordance with the invention if a stretching ram provided with a drive extends through the mixing chamber and into the container, in which case the pressure in the mixing chamber and the container is in the range of between 2 bars and 15 bars in the pre-forming operation. That stretching ram is moved mechanically and produces a mechanical stretching component in addition to the radial pressure force of the exploding gases. More specifically, the injection-moulded preform of plastic material is heated as in the known methods and then pre-formed to the above-mentioned low pressure of between 2 and 15 bars by a gas blown into the container, in such a way that the internal volume of the container is increased by that gas. Even if the pressure in the container were not to be released, the coating operation can be carried out in the apparatus according to the invention because the fluid responsible for the coating can even be introduced into and atomised in a space or chamber in which a pressure of over 10 bars prevails.

It is further advantageous according to the invention if the distributor block and the stretch blowing mould are fixed to a conveyor and are movable by means thereof through various processing zones. It is possible to envisage a linear conveyor for that purpose. However a round rotor or a rotational conveyor in the form of a carousel is preferred. It can be provided at its periphery with a plurality of coating apparatuses according to the invention It is then possible for example to envisage, on a stationary base surface, an introduction position into which the tool with the stretch blowing mould moves for receiving a preform. Thereafter there is a continuous conveyor movement to a next station or through that station so that one and the same coating apparatus which is fixed on the rotational conveyor passes in succession through various processing zones. The output of a container-producing machine can be increased by a multiple by virtue of that arrangement.

It is further desirable in accordance with the invention if the fluid lines are valve-controlled, insofar as installed between the mixing chamber and the respective fluid line is a metering valve whose opening and closing process are controlled by the output signal of a control which is programmable by means of a computer. To provide the correct shaping procedure and also for the simultaneous or subsequent application of a barrier layer to the inside wall of the shaped container, it is important to supply the mixing chamber with the respectively correct amount of the respective fluid. When feeding only gases, the use of a metering valve may be obvious in itself in one case or another, in contrast when using the atomising fluid a metering valve has not yet been used in this arrangement. More specifically a fluid, preferably a liquid precursor material, must be passed under a pressure of at least 40 bars into a metering valve and delivered thereby under time control, whereafter, during delivery of the fluid while still liquid, atomisation thereof and introduction of that finely atomised fluid into the mixing chamber must be carried out. Desirably, a computer-programmable control system is used for successful valve control.

In that respect, it has proven to be particularly desirable if, according to the invention, the output signal of the control which is programmable by means of a computer is controllable by an input signal which is fed into the computer-programmable control and which is produced by measuring at least one physical property of the fluid mixture during or after combustion or of the barrier layer after combustion. In other words the computer-programmable control outputs an output signal to the metering valve, for metering of the respective fluid. The valve has to be controlled. It is controlled by an input signal which is fed into the above-mentioned control system. This is therefore the computer-programmable control. The input signal which is fed into that control is produced by a measurement procedure. This involves either the measurement of at least one physical property of the fluid mixture or measurement of the barrier layer. The at least one physical property of the fluid mixture can be measured during or after combustion. The property of the barrier layer can be measured only after combustion. The fluid mixture can for example receive a different colour during combustion. That colour difference is then the physical property. It is possible to measure that during combustion for the reason that colouring substances can occur, due to a chemical reaction, during combustion. A colour difference can certainly be measured after combustion. The barrier layer in contrast is only produced by combustion and therefore the physical property thereof can only be measured after combustion.

According to the invention at least one sensor can be mounted outside the container in the tool. The above-mentioned physical property is measured by means of that sensor. If a sensor is arranged outside the container in the tool, that advantageously makes it possible to directly determine corresponding physical properties in the container if for example the situation involves beams. By virtue of those X-ray beams, optical beams or infrared beams, it is possible for physical properties to be directly detected in the container and used to influence the following coating procedures. It will be appreciated that it is also possible to influence moulding procedures. It is therefore possible in that way to modify the process parameters of an immediately following process cycle.

Industrial applicability is afforded by virtue of the measures according to the invention because it is possible to adjust or also adapt process parameters, so-to-speak automatically. Thus for example it is possible to alter or compensate for slowly occurring effects, during a continuous production. If two or more sensors are disposed outside the container and in the tool, it is then immediately possible to measure a plurality of parameters and to refine the influence exerted on following process cycles.

It is also advantageous if at least one sensor is mounted in the distributor block Mounting the sensor in the distributor block is technically easier to implement. In this case the sensor can be for example a pressure sensor, a heat sensor or an acoustic sensor. Light measurements in the container can admittedly not be carried out in that way, but sometimes the properties which are measured from pressure and temperature can be sufficient for controlling operation of the machine.

Admittedly it is possible to investigate the coating layers produced and deposited on the internal surface of the container walls, in which respect for example the mass per surface area or the penetration of oxygen thereinto is measured. Quantification is effected here for example by means of X-ray fluorescence. If however a machine with a plurality of coating apparatuses according to the invention is to be operated at a higher output level, then such a production machine should be automated to a greater degree, with measures for reliably and continuously adjusting and/or adapting the process parameters.

It is also advantageous if, according to the invention, the sensor is a radiation sensor. It is possible for example for the process to be very well monitored in real time if the integrated light intensity is sensed. This involves that light intensity which is emitted by combustion. The higher the respective level of intensity, the correspondingly more are precursor components involved in the reaction and the correspondingly thicker is the barrier layer produced. In a particular case, an emitted light radiation was monitored, which emits the characteristic 334 nm-UV-nitrogen line. That emission occurs when a given amount of nitrogen is added to the precursor gas. In the case specifically investigated, that admixing was intended in order to produce a coating in the nature of silicon nitride. It is known that a good barrier property can be achieved thereby. Another example involved investigating SiOx-coatings, by detecting the light emission from short-life OH-radicals.

Another test involved monitoring acoustic emission by means of the above-mentioned acoustic sensor. It is also possible to use an IR-diode for determining the heat which is given off.

For use of a radiation sensor, DLC-type coatings (diamond-like carbon) were also used. In that case the light emission from a hydrocarbon intermediate product was monitored.

It can also be desirable according to the invention if the sensor for measuring the finished barrier layer is
- a device for determining the thickness of the barrier layer,
- an X-ray fluorescence device with a source for X-radiation,
- a colour measuring device with a light source,
- a device for measuring the light scatter with a light source, or
- a device for measuring the light intensity with a light source.

It may be desirable according to the invention to produce a signal with such sensors immediately after the coating process. An example would involve determining the mass of the deposited coating material by X-ray fluorescence. The finished container can be identified even prior to leaving the coating apparatus. A memory-programmed control could then adjust the amount of precursor gas, which is to be appropriately injected at the next station. Instead of X-radiation measurements which under some circumstances are still too time-consuming, it is also possible to think of faster measurements of coating thicknesses. The suggestion here is fast IR-spectroscopy of $CO_2$.

With all the above-mentioned proposals, either monitoring real time by means of radiation, pressure, heat, acoustic emission of the coating process itself or fast qualification of the deposit after the coating process, for example by measurement of the thickness involved, by the above-mentioned X-radiation fluorescence, colour measurements of the coating, or light scatter, the measures according to the invention make it possible to produce a signal which is detected from the container which has just been finished and coated, the signal being used as a feedback message for the control system in order then to adjust process parameters, on the basis of which the immediately following container is produced and/or coated.

Very good results were achieved in operation of a preferred coating apparatus in which the coating was produced during the moulding of the container (a PET bottle). A mixing chamber in a distributor block was connected to fluid lines and metering valves, wherein the container arranged at one side of the distributor block was firstly fixed in the form of a preform in such a way that the internal space thereof was in communication with the mixing chamber. As the first step air as an oxygen carrier was connected to the mixing chamber and hydrogen in a separate fluid line was connected second to the mixing chamber. As the third step the outlet nozzle of a metering valve for a precursor material was connected to the mixing chamber. The precursor material was initially available in liquid form, it was then compressed with a pump to over 40 bars and atomised at the discharge end of the nozzle by substantial relief to about 10 to 15 bars. The fluid intake lines opened tangentially into a cylindrical mixing chamber, whereby all gases or gas-like fluids (mist) acquired a twist on their way to spreading out in the entire mixing chamber, into the interior of the preform. That promoted mixing of the three fluid components so that it was possible to introduce a practically homogeneous mixture into the internal space of the preform. A firing device was provided in the mixing chamber and initiated combustion of the homogeneous gas mixture in such a way that the preform heated to softening temperature (about 90 to 120° C.) could be expanded in such a fashion that its walls were caused to bear against the inside walls of the stretch blowing mould, whereby the desired container reached its bottle shape. The combustion further allowed reaction of the constituents of the precursor gas in such a way that a coating was applied to the inside walls of the container being formed. After a cooling phase it was possible to open the openable and closable stretch blowing mould and the finished moulded container provided with the internal coating (PET bottle) could be removed and carried away.

Further advantages, features and possible uses of the present invention are apparent from the description hereinafter of preferred embodiments by way of example with reference to the accompanying drawings.

A round rotor machine with six coating apparatuses for industrial use is shown in FIG. 1. Supported over a diagrammatically indicated frame table 1 is a rotational conveyor 2 around a drive shaft 3 with a round base plate 4 and a concentric cover plate 5. In the direction of view of the drive shaft 3 downwardly on to the frame table 1, the rotational conveyor 2 is drivable during operation in the anti-clockwise direction corresponding to the curved arrow 6 (direction of rotation), at a constant angular speed.

Figure 2:
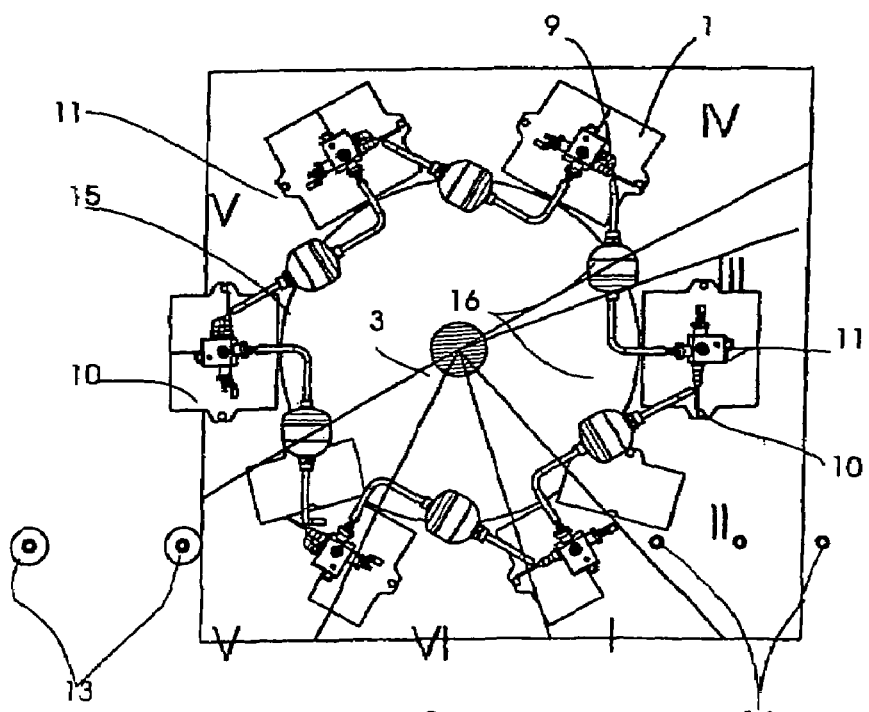
FIG. 2 shows a plan view of the rotational conveyor of FIG. 1 without cover plates, with a view on to the six stretch blowing moulds with pressure storage devices.

Distributed at the periphery the lower base plate 4 carries pairs of vertical support bars 7, while mounted between each two support bars 7 is a respective cylinder 8 for the stretching ram (to be described hereinafter) of a respective coating apparatus generally identified by reference 9. The rotational conveyor 2 carries six coating apparatuses 9, and for that reason the Figure shows six pairs of vertical support bars 7 which connect the base plate 4 to the cover plate 5. The distributor blocks 10 with a stretch blowing mould 11 arranged thereneath are mounted under the base plate 4 and above the frame table 1, corresponding to the six coating apparatuses 9. The mould 11 comprises two substantially parallelepipedic halves which internally have a negative shape 12 of the container 13 to be moulded. That container 13 as shown in FIGS. 1 and 2 is in the form of a bottle. One half of the stretch blowing mould 11 also contains only one half negative mould 12, the two negative moulds 12 facing towards each other and, when the stretch blowing mould 11 is closed, forming the space of the finished container 13. The container is produced and transported in a vertically upright form. The preforms 14 required for its manufacture are also oriented and conveyed in a vertical position with the opening upwardly. In a corresponding fashion the separation plane between the two halves of the stretch blowing mould 11 extends vertically from below upwardly and therefore parallel to the drive shaft 3. Those two halves of the stretch blowing mould 11 are pivotably connected at one side by way of a vertical hinge in such a way that they can be moved away from each other and brought together. In the opened condition the workpieces can be introduced and removed therefrom.

Besides the stretch blowing mould 11, each coating apparatus 9 which is also shown as a plan view in FIG. 2 without the plates 4 and 5 includes the distributor block 10, a pressure storage device 15 and fluid lines 16.

FIG. 2 further shows six angle regions, through which each of the six coating apparatuses 9 is passed once in the rotary movement 6 through 360°. These involve the angle zone I for introduction of the preforms 14. In the anti-clockwise direction, that angle zone 1 is followed by the larger angle zone II for pre-blowing and thus pre-shaping of the preforms 14. There then follows the very small angle zone III for firing, during which the combustion process also begins and takes place. The cooling process is implemented in the angle zone IV which then follows and which is nearly 180° in size. In the zone V the halves of the mould 11 are again opened and the containers 13 which have been moulded and coated are removed. The angle zone VI serves for an idle step and affords reserves for any adjustment procedures.

Figure 3:
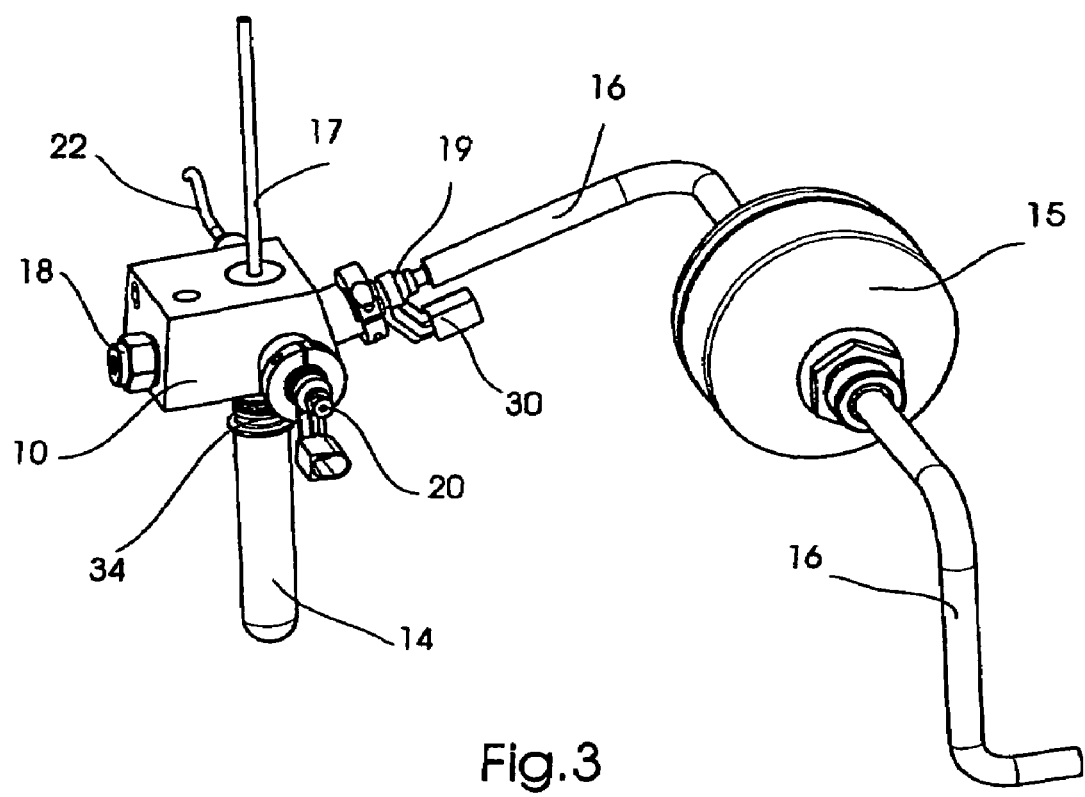
FIG. 3 is a perspective view of a distributor block with some fluid connections, an applied preform and a pressure storage device.

FIG. 3 shows the preform 14 fitted to the distributor block 10 at the underside thereof. The stretching ram 17 projects vertically upwardly out of the distributor block 10 concentrically with the preform 14. The stretching ram 17 is movable vertically and is moved forward and back with a translatory movement by the above-described cylinders 8 in order to stretch the soft preform 14 lengthwise in the pre-blowing operation. As shown in FIG. 3, perpendicularly to the vertical direction of the stretching ram 17, the gas oxygen passes by way of entering air through the air connection 18 into the distributor block 10. The air lines (also referred to as fluid lines) which are connected to that air connection 18 are not specifically shown here in the Figures. On the side of the distributor block 10, which is opposite to the air connection 18, the fluid line 16 passes precursor material into the metering valve provided for same, with the valve body 19 for precursor liquid. If the air connection 18 on the one side of the distributor block 10 were to be connected to the valve body 19 on the other side thereof with a notional line, then, perpendicularly to that line and perpendicularly to the stretching ram 17, a further fluid line (not shown) for hydrogen passes into the hydrogen nozzle generally identified by 20 and then into the mixing chamber 21 shown in FIG. 5, into the distributor block 10. In addition FIG. 3 also indicates, on the side of the distributor block 10, which is opposite to the hydrogen nozzle 20, a plug with a cable 22 for introducing control voltages.

Figure 4:
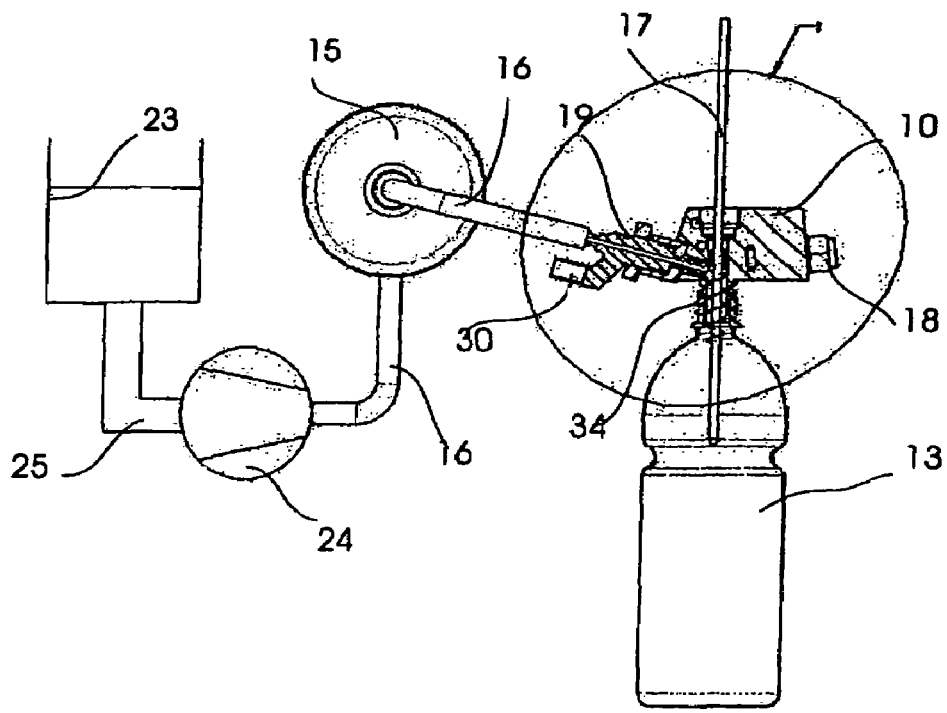
FIG. 4 shows a diagrammatic side view of the distributor block with the feed path for the precursor material and the moulded container (bottle form)
Figure 5:
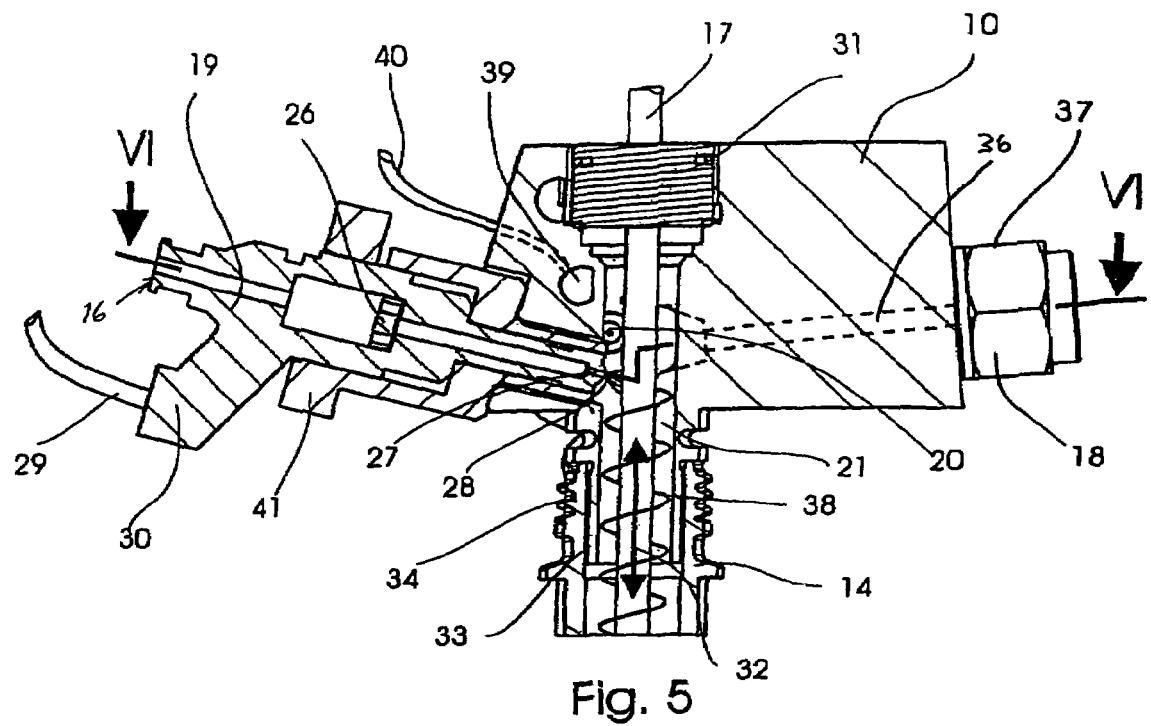
FIG. 5 shows a somewhat diagrammatic sectional view corresponding to the detail in the circle X in FIG. 4.

FIG. 4 shows the essential parts of a coating apparatus 9 in which the stretch blowing mould has been omitted and indicating charging of the fluid lines 16 for the precursor liquid. That precursor liquid, as a fluid, is contained in the output tank 23 at ambient temperature and normal pressure. A pump 24 diagrammatically indicated in FIG. 4 draws the precursor liquid out of the tank 23 by way of the line 25 and urges it under a high pressure of over 40 bars through the fluid line 16 into the pressure storage device 15. That precursor liquid is applied in the valve body as far as the valve 26 diagrammatically shown in FIG. 5. It is only when that is opened, that the precursor liquid can pass at its high pressure into the outlet nozzle 27 which is also shown in FIG. 5, in order to be atomised at the interface at the atomisation location 28 (FIG. 5), directly at the entry into the mixing chamber 21. The control signal for the valve 26 is introduced by way of the line 29 which is fed to the valve 26 by way of the electrical connection 30 from a computer-programmable control (not shown).

Figure 6:
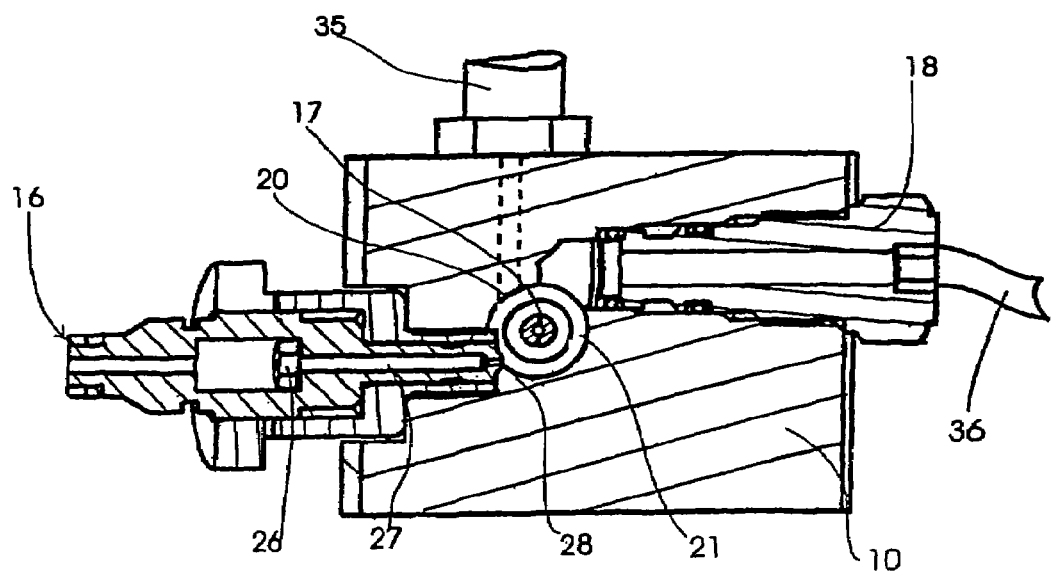
FIG. 6 shows a cross-sectional view through the distributor block taken along line VI-VI in FIG. 5 (through the valve body shown at the left in FIG. 5)

FIGS. 5 and 6 show views in section through the distributor block 10 with the parts of the coating apparatus, which are of particular interest. The vertical direction which is also important in the machine is in the stretching ram 17 which is disposed centrally in a mixing chamber 21 of a cylindrical shape and can be moved up and down in the direction of the vertical double-headed arrow 32 in sealed relationship by way of a closure member 31 in the distributor block 10 or through the mixing chamber 21 thereof. Reference 33 denotes a holder in the form of a cylindrical portion which extends vertically downwardly from the distributor block 10, and on to which is fitted the bottle neck 34 of the preform 14 which is shown in broken-away form therebeneath. It will be seen that the also cylindrical interior of the preform 14 is in direct communication with the mixing chamber 21. The mixing chamber 21 is delimited upwardly only by the closure member 31. In the illustration in FIG. 5 the view is on to the hydrogen nozzle 20 and the outlet nozzle for the precursor liquid 27 can be seen at the left. In FIG. 6 the whole hydrogen feed is denoted generally by 35. The nozzle 20 thereof is fitted in FIG. 6 tangentially to the mixing chamber 21 so that the hydrogen which is discharged and flows into the mixing chamber 21 begins to flow along a helical line. The same applies for the incoming flow of air by way of the air connection 18, the fluid line 36 of which is shown in broken-away form in FIG. 6, while FIG. 5 shows at the right the screw means 37 at the end, which is towards the device, of the fluid line 16 for air. The air also flows tangentially into the mixing chamber 21, as also applies, as shown in FIG. 6, for the precursor material which is atomised by the nozzle 27. Consequently, the three fluids form the helical path 38 shown in FIG. 5 with a vertical component in a downward direction, so that a practically homogeneous gas mixture is introduced into the mixing chamber 21 on the one hand and the internal space of the preform 14 on the other hand. FIG. 5 also shows a sensor 39 which passes measurement data by way of a measurement cable 40 from the interior of the distributor block 10 outwardly to evaluation units (not shown). The valve body 19 shown in FIG. 5 is held to the distributor block by way of the adaptor 41 with a flange 42.

Figure 7:
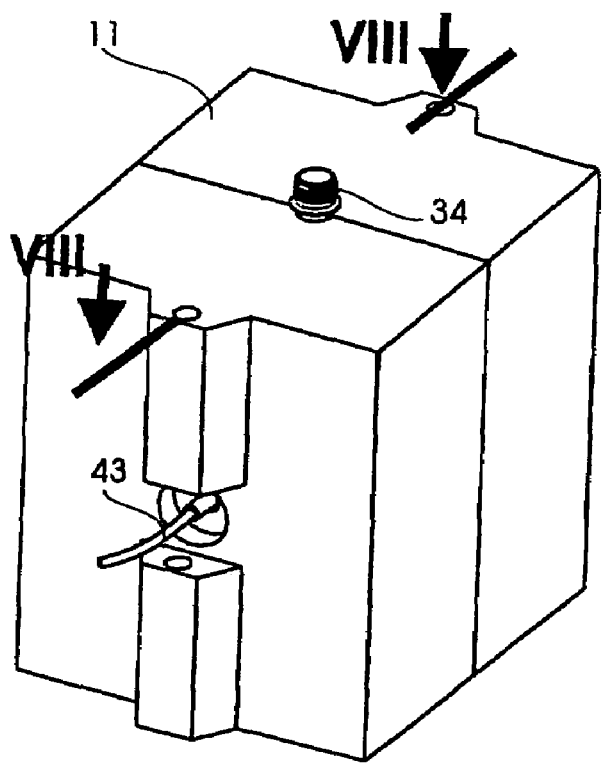
FIG. 7 shows a diagrammatic view in cross-section through a closed stretch blowing mould with a shaped container therein, with a light source and a measuring probe.
Figure 8:
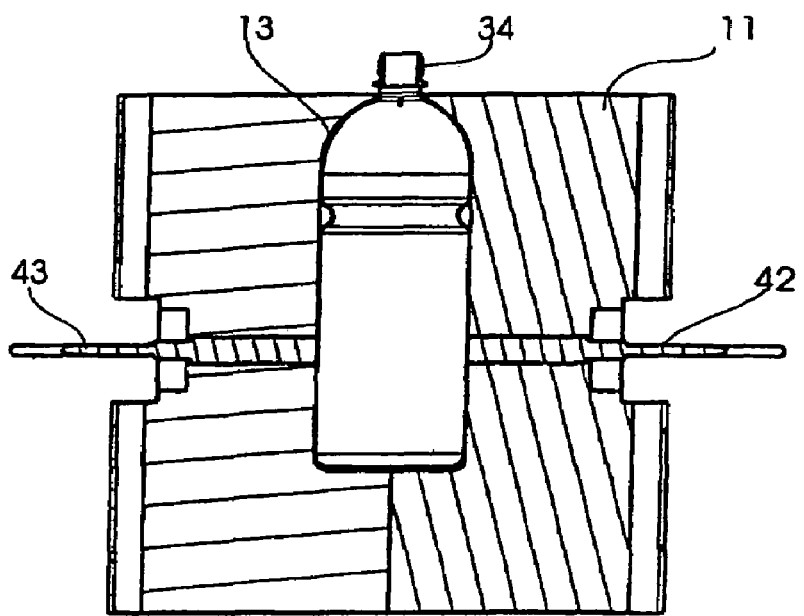
FIG. 8 is a diagrammatic perspective view showing the two halves of the closed stretch blowing mould of FIG. 7 from the exterior with section line VII-VII.
Figure 9:
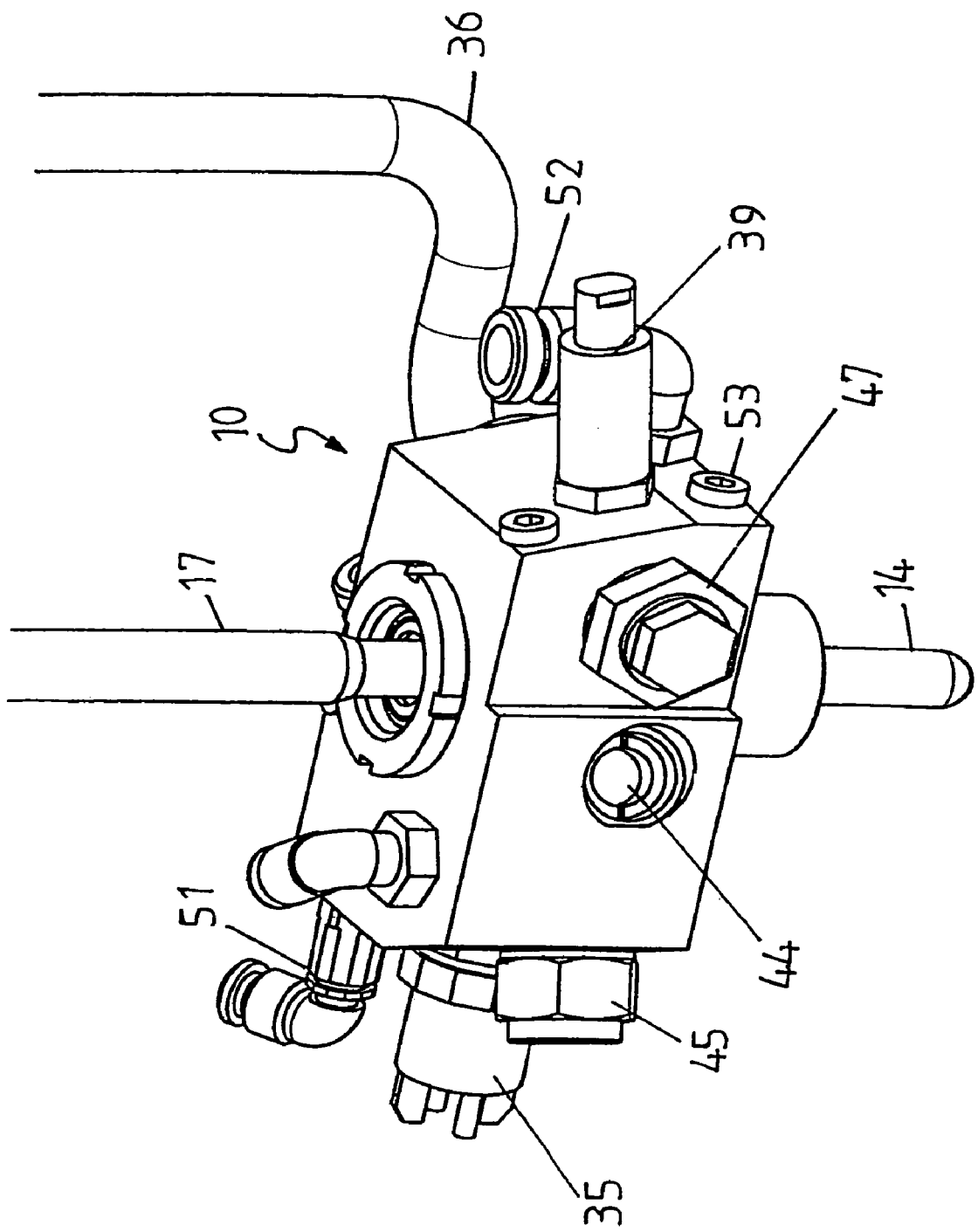
FIG. 9 shows a perspective front view of a distributor block of a second embodiment.

FIGS. 7 and 8 show that embodiment involved when measuring the physical properties of the fluid mixture, in which a measuring probe 40 is arranged on one side of the container 13 and a light source 43 is arranged on the opposite side in the stretch blowing mould 11.

For operation of the coating apparatus, as a preparatory step, a continuously adjustable electric motor is set up for the drive for the pump 24 (FIG. 4) as a high-pressure pump. As the computer-programmable control, a PLC-device is used and is connected to a control unit from which control signals go to the individual valves, sensors, regulators and to the motor. The PLC sends set values for the liquid volume in the tank 23 for precursor liquid, values for the injection pressure and also the starting point of the injection operations to the control unit. The operating procedure takes place in a correspondingly controlled manner.

If the angle zones in FIG. 2 are considered, then the rotational movement can be begun as indicated by the curved arrow 6 in the angle zone I. Here the stretch blowing mould 11 is opened and the leading preform of a row of uniformly spaced preforms 14, after travelling along the conveyor path from right to left in FIG. 2, passes in a holder with preheating to a softening temperature of 80 to 90° C., to the location at which the preforms are introduced into the negative mould 12. There the preform is fitted on to the cylindrical holder 33 (FIG. 5), in the manner illustrated in FIG. 3. Thereafter the stretch blowing mould 11 is closed. Because the rotational conveyor 2 rotates at a constant angular speed in the direction indicated by the curved arrow 6, in the meantime, until the stretch blowing mould 11 is closed, the apparatus has travelled through the angular region of about 20° of the angle zone I for introduction of the preform 14.

Now the closed stretch blowing mould 11 passes into the angle zone II in which pre-blowing of gases into the mixing chamber 21 and the interior of the preform 14 begins. Air is blown into the mixing chamber 21 by way of the air connection 18 at room temperature under a pressure $\leq 15$ bars. Then hydrogen is also blown tangentially into the mixing chamber 21 by way of the hydrogen feed 35 and through the hydrogen nozzle 20 eccentrically in relation to the vertical centre line and eccentrically in relation to the stretching ram 17 so that the air with the oxygen contained therein and also the hydrogen are mixed in a helical line, corresponding to the helical path 38 of the fluids. Thus a pressure of about 12 to 13 bars has built up in the mixing chamber 21 in order, together with the vertical downward movement of the stretching ram 17, to expand the preform 14 and in part already to put it into the shape of the ultimately desired container 13.

The precursor liquid is now also passed by opening of the valve 26 (FIG. 5) to the outlet nozzle 27 for precursor liquid and there to the atomisation location 28. About 0.5 to 1.5 liters of air is used for a microliter of precursor liquid. As a consequence of that ratio, atomisation and admixing of precursor liquid begins after air and hydrogen have already been supplied. The supply times thereof are longer; the supply time of the precursor material is controlledly shorter. The pressure generated by the pump 24 and the geometry of the nozzle 27, in particular at the atomisation location 28, provide for the production of the mist or conversion of the precursor liquid into very fine droplets with a gas-like behaviour. Upon being eccentrically tangentially introduced into the cylindrical mixing chamber 21, for example at an angle of 15° relative to the stretching ram 17, the precursor mist can pass into the helical path 38 of the fluids and can there be intimately mixed with the other gases. The mixing chamber 21 and also the interior of the preform 14 act like a turbulent swirl chamber. Pre-blowing of the container to about 90% of its definitive configuration by means of the now explosive gas mixture (air, oxygen, hydrogen, precursor material) is terminated after passing through the angle zone II over an angle of about 60 to 80°.

During the passage through the angle zone III, firing is effected by means of a firing device for initiating combustion, which is arranged in the tool, for example in the distributor block 10 or even in the stretching ram 17. That angle zone III sees the implementation of definitive shaping, in which the walls of the preform 14 are caused to bear against the inside wall of the negative mould 12 of the stretch blowing mould 11. After firing and after passing through the angle zone III over an angle of 5° to 25°, preferably 15°, the coating apparatus now passes into the angle zone IV in which a cooling operation begins and is concluded after passing through an angular region of about 180°. At the same time as the walls of the container, the internal coating is also cooled.

In the stretch blowing mould 11 while still closed, the container passes into the angle zone V in which the stretch blowing mould 11 opens and the container 13 can be removed. It is then placed on a linear conveyor at bottom left in FIG. 2 and removed to the exterior horizontally towards the left. Thereafter the open stretch blowing mould 11 passes through the idle-mode angle zone VI so that, on passing into the angle zone I for introduction of the preform 14 it can again receive the latter. The cycle on that rotational conveyor 2 begins afresh here.

It will be appreciated that injection of the precursor liquid by opening of the valve 26 is controlledly effected until the valve 26 is closed again. Disposed in the tool, that is to say the mould 11, is a sensor 40 as a measuring probe, corresponding to the illustration in FIG. 7. The sensor is disposed outside the container 13 in the course of production. The light source 43 is disposed on the side opposite the container 13, on the optical axis shown in FIG. 7. In that way it is possible for example to measure the colour property of the fluid mixture in the container 13, during or also immediately after combustion. The measurement signals are passed into the control and can already influence the process involved in shaping and coating the next following container. It is also possible to adopt other measuring processes if the sensor (or also a plurality of sensors) is or are arranged in the distributor block 10 itself. Admittedly, radiation measuring procedures are not possible in that way, but in this case the design configuration of the measuring installation is technically simpler. It is also possible to obtain valuable parameters from measurements in respect of temperature, pressure, sound and so forth, in order to influence shaping and coating of the next following container in a continuous operating procedure, in such a way that the finished products enjoy the desired quality.

In the embodiment illustrated in FIGS. 1 and 2 there are six stations arranged distributed over the periphery of the base plate 4. It will be appreciated that it is also possible to provide 1-40 stations depending on the respective technical options involved.

FIGS. 9 to 14 show a further embodiment of the invention which here concerns an apparatus for producing plastic containers by means of stretch blowing without a coating apparatus. In these Figures, insofar as this is possible, the terms and references for the same or at least similar components are used again.

Figure 10:
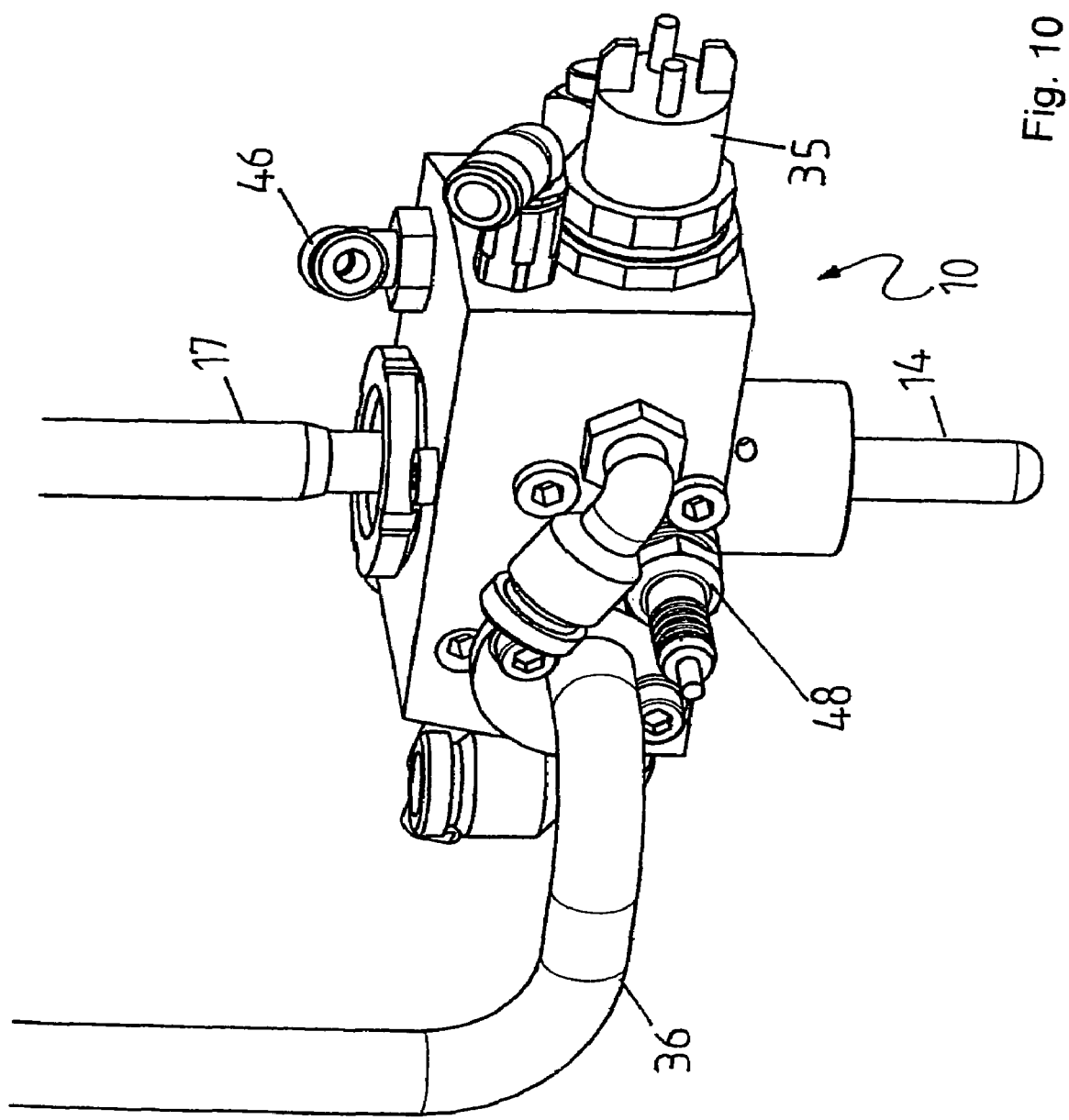
FIG. 10 shows a perspective view from the rear of the distributor block of FIG. 9.

FIG. 10 shows a distributor head 10 according to the invention which is connected directly to the preform 14. This will be particularly clearly seen from FIG. 14 which shows a view in section taken along line B-B in FIG. 13.

It is possible to see the preform 14 which bears directly against at least one sealing element 49 of the distributor block 10. It is also possible to see the stretching bar or stretching ram 17 which extends into the internal space of the preform 14. In this configuration the mixing chamber 50, together with the internal space of the preform 14, forms the combustion chamber 21. It can be clearly seen that the volume of the combustion chamber 21 is formed essentially only by the internal volume of the preform 14, being the volume surrounding the stretching ram 17. The volume proportion of the combustion chamber 21 which is in the distributor block 10 is very small and is here about 11 cm$^3$. It is also possible to see in FIG. 14 the spark plug 48 which extends through the distributor block 10 into the annular mixing chamber 50. It will be appreciated that instead of this, the firing device could also be arranged in the stretching ram 17.

Figure 11:
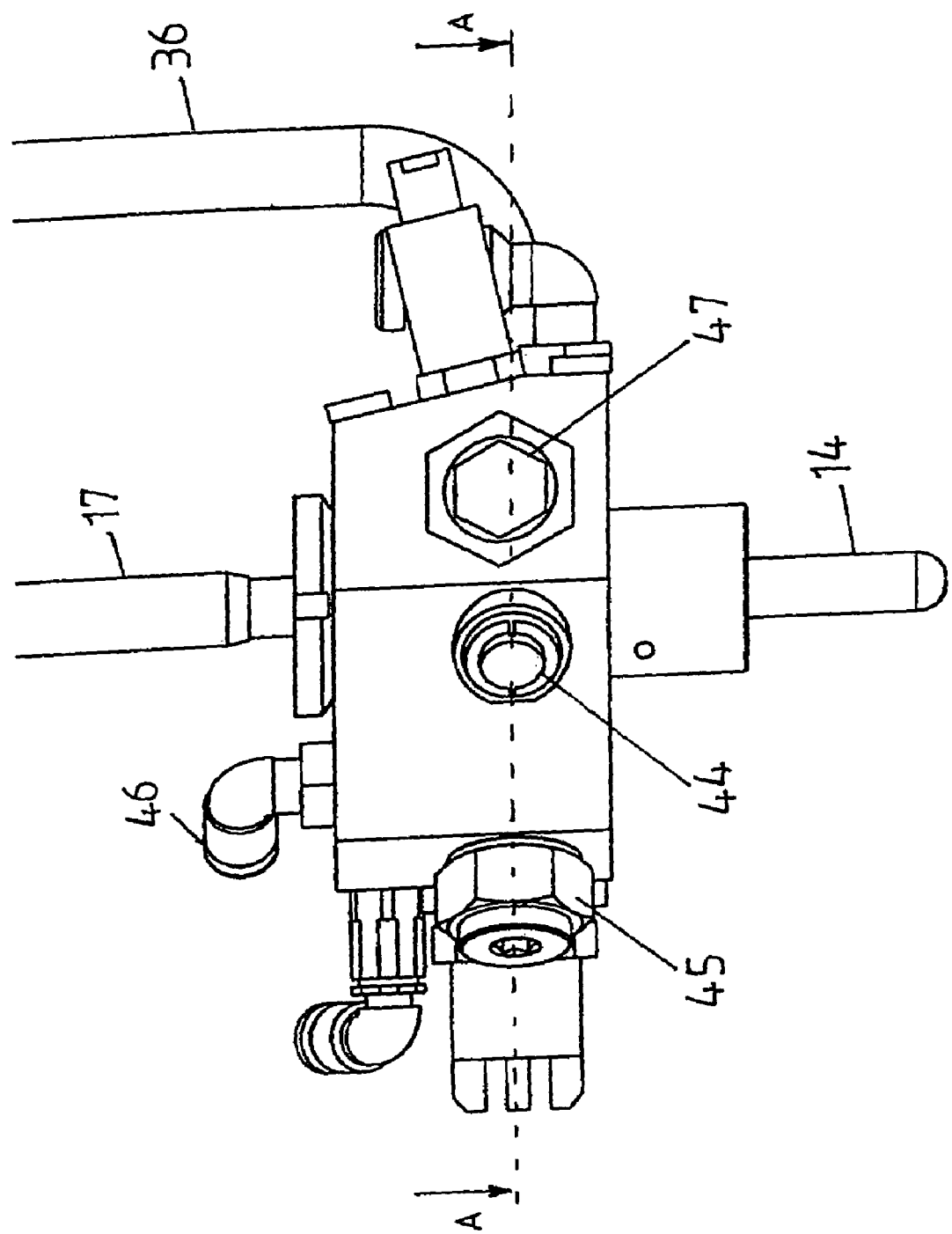
FIG. 11 shows a front view of the distributor head of FIG. 9.
Figure 12:
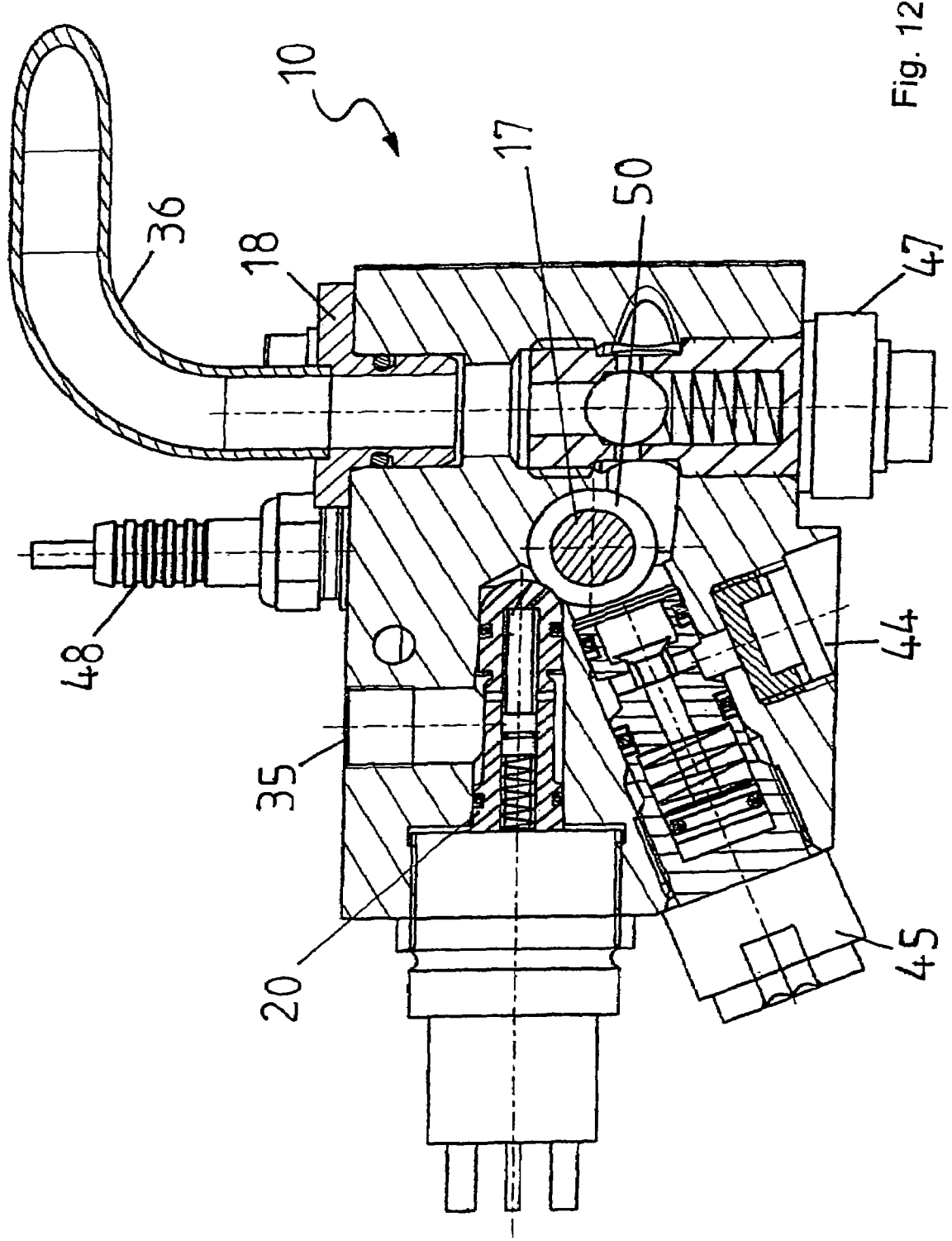
FIG. 12 shows a view in section taken along line A-A in FIG. 11.
Figure 13:
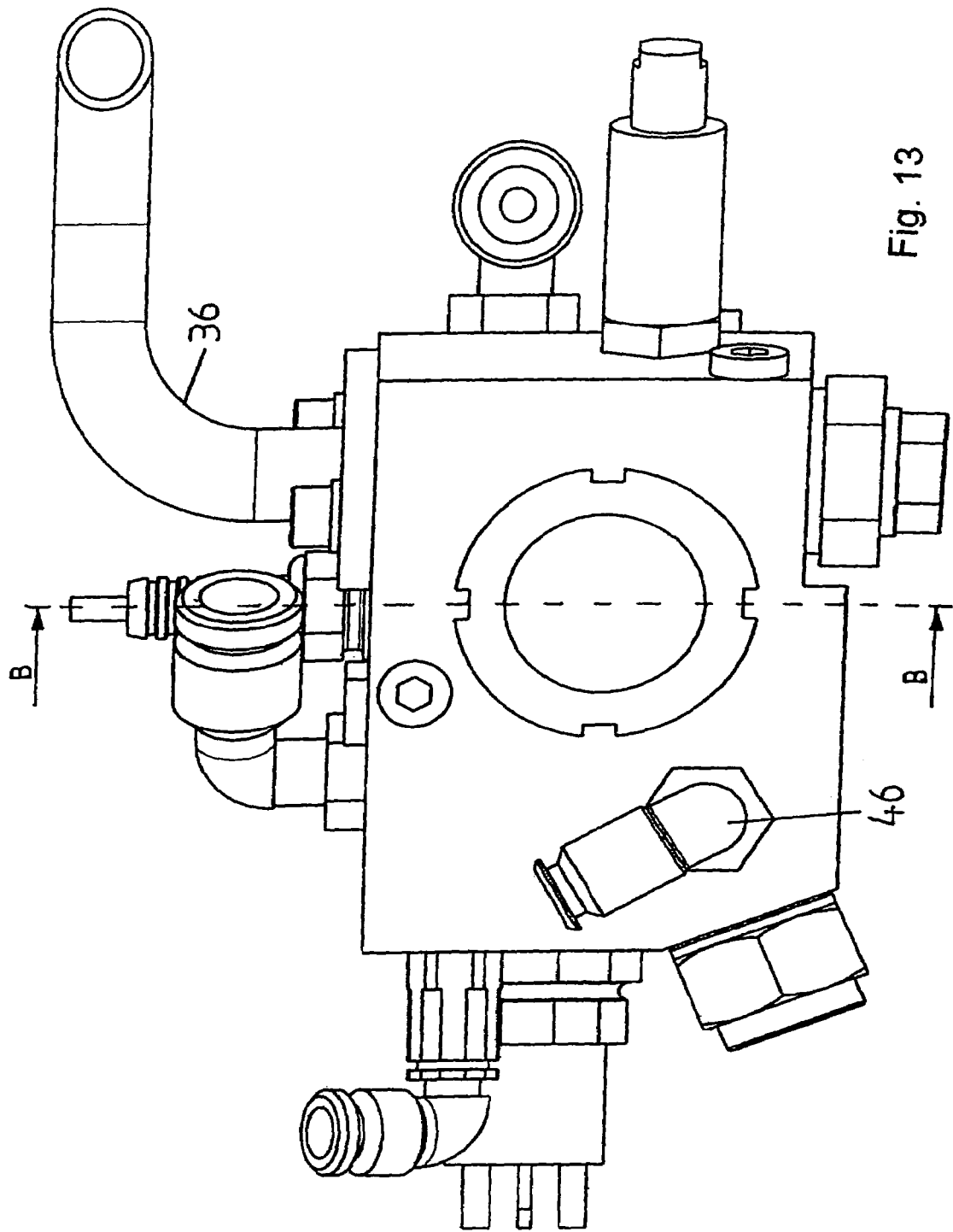
FIG. 13 shows a view from above on to the distributor head of FIG. 9.
Figure 14:
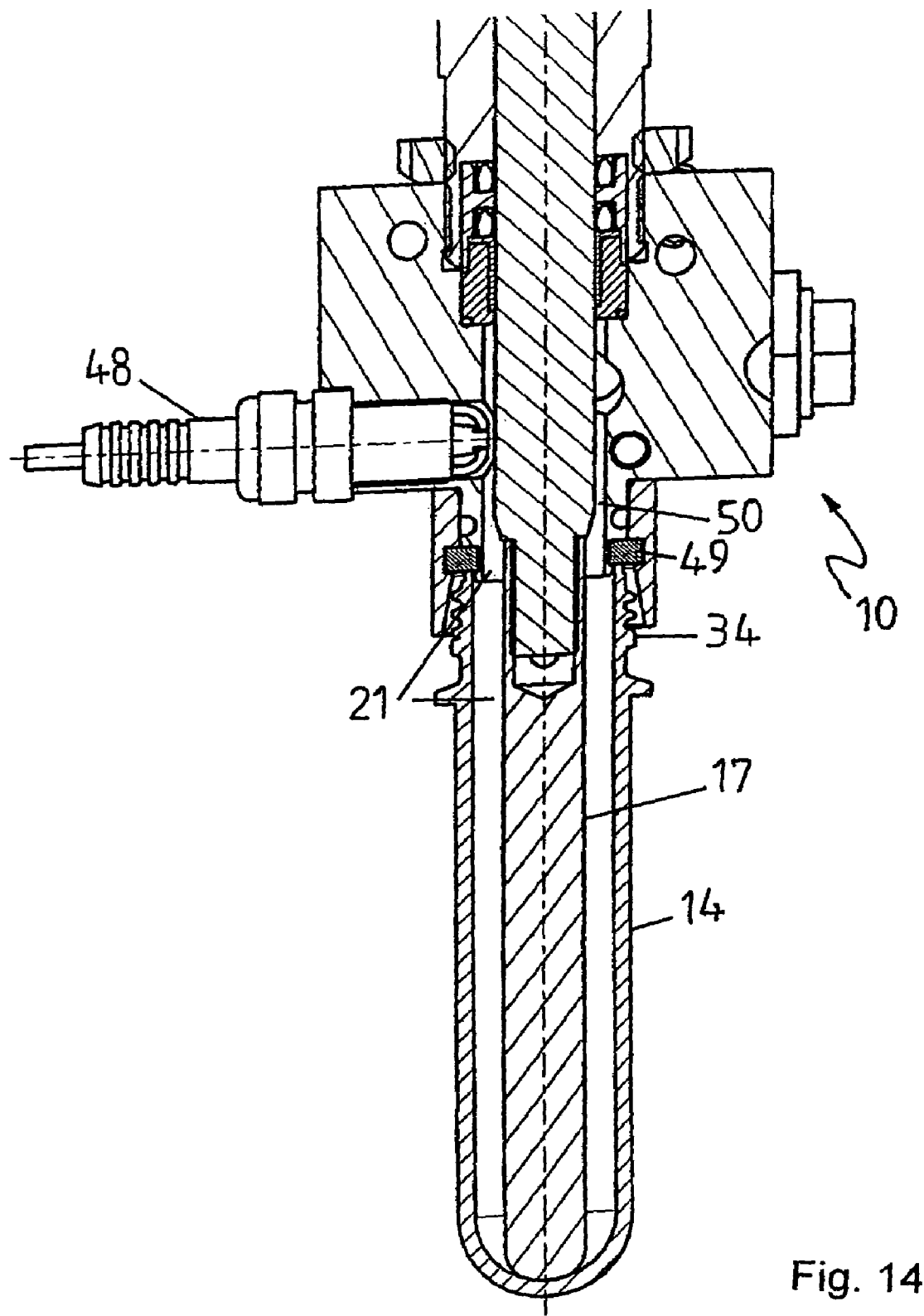
FIG. 14 shows a view in section taken along line B-B in FIG. 13.

Further details of the distributor head 10 according to the invention can be more clearly seen in the sectional view in FIG. 12 taken along line A-A in FIG. 11. In this case also it is possible to see the distributor block 10 in which the spark plug 48 is fitted. A fluid line for feed air 36 is connected to the air feed connection 18. The air feed valve 47 which in this embodiment is in the form of a non-return or check valve closes or opens the air feed line in relation to the annular mixing space 50. The annular mixing space 50 is provided by the approximately cylindrical bore in which the stretching bar or stretching ram 17 is arranged. It is also possible to see a feed for hydrogen 35, which can be connected by way of a needle valve 20 to the mixing chamber 50 or the combustion chamber 21. The needle valve 20 is in this case also in the form of a non-return valve.

It is also possible to see the air outlet valve 45 which connects the combustion chamber to the air outlet connection 44.

The explosion stretch blowing process now functions as follows. The preforms 14 are firstly heated to a temperature which is suitable for the stretch blowing process and introduced into a mould (not shown here), the internal shape of which corresponds to the container to be produced. The preform is now axially stretched by the stretching ram which moves in the axial direction. At the same time an explosive gas mixture is produced in the combustion chamber 21 and the mixing chamber 50 by means of the air feed valve 47 and the valve 20 for the hydrogen feed. In that case the gas is put under a pressure of between about 3 and 10 bars. Due to that stretching pressure, the diameter of the preform is also increased. When the preform has reached its axial length, the explosive fluid is fired by means of the spark plug 48 which extends into the mixing chamber 50. Due to the explosion, the pressure within the preform would be abruptly increased to a region of about 30 to 50 bars. That so-called blowing pressure causes the preform 14 to be pressed completely against the stretch blowing mould (not shown), and thereby acquires the shape of the bottle to be produced. Proper implementation of the explosion can be monitored and detected by means of the pressure sensor 39. After the corresponding pressure has been reached the air outlet valve 45 is opened by means of the control air feed 47 for the air outlet valve 45, so that the pressure and therewith also a large part of the reaction products produced in the explosion can escape by way of the air outlet connection 44.

Particularly when the distributor block 10 is used in a round rotor machine, the sequence of explosions is so rapid that the distributor head 10 experiences a rise in temperature, by virtue of the explosion energy which is produced in the explosion. Therefore, provided in the distributor head 10 are cooling passages which are closed in part by means of closure screws 53. Cooling water however can penetrate by way of the cooling water inlet 51 into the distributor block 10 and leave it again by way of the cooling water outlet 52. That ensures that uniform process conditions prevail during operation of the machine.

Following is a list of reference numbers representing parts and items shown in the drawings and described in the text.
1 frame table
2 rotational conveyor
3 drive shaft
4 base plate
5 cover plate
6 curved arrow (direction of rotation)
7 vertical support bar
8 cylinder for the stretching ram
9 coating apparatus
10 distributor block
11 stretch blowing mould
12 negative mould
13 container (PET bottle)
14 preform
15 pressure storage device
16 fluid line
17 stretching ram
18 air connection
19 valve body for the precursor liquid
20 hydrogen nozzle
21 mixing chamber
22 cable for control voltage
23 output tank for precursor liquid
24 pump
25 line
26 valve
27 outlet nozzle for precursor liquid
28 atomisation location
29 line for control signal
30 electrical connection
31 closure member
32 vertical double arrow
33 cylindrical holder
34 bottle neck
35 lines, e.g. fluid line for air
36 fluid line for air
37 screw
38 helical path of the fluids
39 sensor
40 measuring cable
41 adaptor
42 flange of the adaptor 41
43 light source
44 outlet air
45 air outlet valve
46 control air for air outlet valve
47 air feed valve
48 spark plug
49 seal
50 internal chamber of mounting block, mixing chamber
51 cooling water inlet
52 cooling water outlet
53 closure screw
I zone for introduction of the preforms 14
II zone for pre-blowing of the preforms 14
III zone for firing of the preforms 14
IV zone for cooling of the preforms 14
V zone for removal of the containers 13
VI zone for idle mode

What is claimed is:

1. An apparatus (2), for producing plastic containers (13) by means of stretch blowing comprising a rotatable rotor; at least one distributor block (10) connected to the rotor, said distributor block having a mixing chamber (21) which can be directly connected to an internal space of a preform (14) so that a combustion chamber (21) is formed from the mixing chamber (21) and the internal space of the preform (14); a feed device for feeding an explosive fluid into the combustion chamber (21); and a firing device for firing the explosive fluid in the combustion chamber (21), characterised in that the distributor block (10) can be connected directly to a preform (14) or a container.

2. An apparatus according to claim 1 wherein the apparatus is a round rotor machine with a rotatable carousel for receiving a plurality of distributor blocks (10) having a mixing chamber (21) which can be directly connected to an internal space of a preform (14).

3. Apparatus according to claim 2 wherein the distributor blocks (10) are arranged in such a way that they can be rotated together with the carousel.

4. Apparatus according to claim 1 wherein the volume of the mixing chamber (21) is smaller than 50 cm$^3$.

5. Apparatus according to claim 2 wherein the volume of the mixing chamber (21) is smaller than 50 cm$^3$.

6. Apparatus according to claim 3 wherein the volume of the mixing chamber (21) is smaller than 25 cm$^3$.

7. Apparatus according to claim 1 wherein the volume of the mixing chamber (21) is smaller than 15 cm$^3$.

8. Apparatus according to claim 1 wherein the distributor block (10) has cooling water passages for cooling the distributor block (10).

9. Apparatus according to claim 3 wherein the distributor blocks (10) have cooling water passages for cooling the distributor blocks (10).

10. Apparatus according to claim 1 wherein the distributor block (10) has at least two separate fluid feed passages (16, 18) for the feed of two different fluids, the mixing of which forms the explosive fluid.

11. Apparatus according to claim 2 wherein the distributor block (10) has at least two separate fluid feed passages (16, 18) for the feed of two different fluids, the mixing of which forms the explosive fluid.

12. Apparatus according to claim 3 wherein the distributor block (10) has at least two separate fluid feed passages (16, 18) for the feed of two different fluids, the mixing of which forms the explosive fluid.

13. Apparatus according to claim 5 wherein the distributor block (10) has at least two separate fluid feed passages (16, 18) for the feed of two different fluids, the mixing of which forms the explosive fluid.

14. Apparatus according to claim 8 wherein the distributor block (10) has at least two separate fluid feed passages (16, 18) for the feed of two different fluids, the mixing of which forms the explosive fluid.

15. Apparatus according to claim 10 wherein the distributor block (10) has a distributor head including at least one needle valve (19) for opening and/or closing at least one fluid feed passage (16).

16. Apparatus according to claim 15 wherein the needle valve (19) is a check valve.

17. Apparatus according to claim 1 wherein a discharge passage (25) is provided for discharge of reaction products produced upon explosion of the explosive fluid.

18. Apparatus according to claim 17 wherein a valve (26) is provided for closing and/or opening the fluid discharge passage (25).

19. Apparatus according to claim 18 wherein the valve (26) has a locking device which prevents opening of the fluid discharge passage (25) and wherein the valve (26) is designed to automatically open due to the pressure produced upon explosion of the explosive fluid, when the locking device is released.

20. Apparatus according to claim 1 wherein a stretching bar (17) provided with a drive extends through the mixing chamber (21) and, when the apparatus is connected to a preform (14), into the preform, wherein the stretching bar (17) is provided for axially stretching the preform (14).

21. Apparatus according to claim 1 wherein the firing device comprises a spark plug (48) which is arranged either in the distributor block (10) or in the part of the stretching bar (17), which when the preform (14) is connected extends into the preform.

22. Apparatus according to claim 1 wherein a pressure sensor (39) is provided for measuring pressure in the combustion chamber (21).

23. Apparatus according to claim 1 wherein at least one fluid line (25) is provided that is connected to an atomisation device (28) which atomization device opens into the mixing chamber (50).

24. A round rotor machine apparatus for coating inside walls of a blow-moulded plastic container (13) with a barrier layer which is impermeable in relation to gases, aroma substances and the like, in which a stretch blowing mould (11) is connected by way of a connecting portion to valve-controlled fluid lines (16, 36) in order to fill the container (13) in the mould (11) with at least one gas, wherein:
the fluid lines (16, 36) open into a mixing chamber (21) of a distributor block (10),
the mixing chamber (21) is in communication with an internal space of the container (13),
a fluid line (16) leads to an atomisation device (27, 28), and
a firing device is provided that fires the atomised and/or mixed fluids in the mixing chamber (21) and the interior of the container (13) for the purposes of combustion.

25. Apparatus according to claim 24 wherein the container (13) can be connected directly to the distributor block (10).

26. Apparatus according to claim 24 wherein the fluid line (16) leading to the atomisation device (27, 28) leads from a pump (24) for producing an internal pressure (p) of at least 40 bars to the atomisation device (27, 28).

27. Apparatus according to claim 24 wherein apparatus is provided for at least partially shaping the container (13).

28. Apparatus according to claim 24 where the atomisation device (27, 28) has a liquid injection nozzle (27).

29. Apparatus according to claim 24 wherein a stretching ram (17) provided with a drive extends through the mixing chamber (21) and into the container (13, 14), wherein in a pre-shaping operation pressure in the mixing chamber (21) and the container (13, 14) is in the range of between 2 bars and 15 bars.

30. Apparatus according to claim 24 wherein the distributor block (10) and the stretch blowing mould (11) are fixed to a conveyor (2) and are movable by means thereof through various processing zones (I-VI).

31. Apparatus according to claim 24 wherein the fluid lines (16, 36) are valve-controlled in that a metering valve (19, 26) is installed between the mixing chamber (21) and a respective fluid line (16, 36), where opening and closing of the metering valve is controlled by an output signal of a control programmable by means of computer.

32. Apparatus according to claim 31 wherein the output signal of the control programmable by means of computer is controllable by an input signal which is fed into the computer-programmable control and which is produced by measurement of at least one physical property of the fluid mixture during or after combustion or the barrier layer after combustion.

33. Apparatus according to claim 31 wherein at least one sensor (39) is disposed outside the container (13) in the distributor block.

34. Apparatus according to claim 33 wherein the sensor (39) is
a radiation sensor (40),
a pressure sensor,
a heat sensor, or
an acoustic sensor.

35. Apparatus according to claim 33 wherein a sensor (29) for measuring the finished barrier layer is provided and is:
a device for determining the thickness of the barrier layer,
an X-ray fluorescence device with a source for X-radiation,
a colour measuring device with a light source,
a device (40) for measuring the light scatter with a light source (43), or
a device (40) for measuring the light intensity with a light source (43).

* * * * *